Patented May 2, 1933

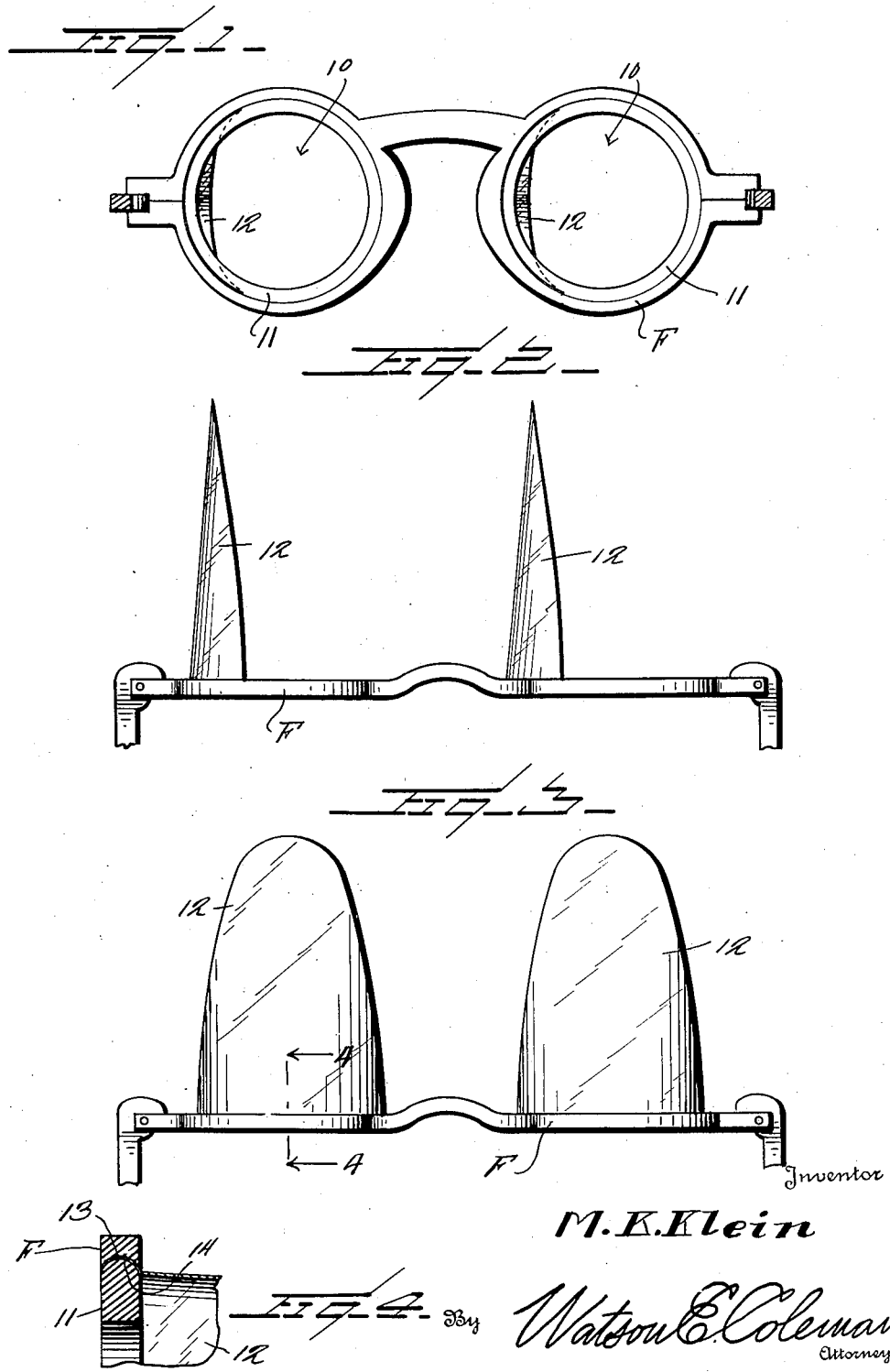

1,907,356

UNITED STATES PATENT OFFICE

MARTIN K. KLEIN, OF GLENS FALLS, NEW YORK

ANTIGLARE SHIELD

Application filed March 8, 1932, Serial No. 597,571. Renewed January 19, 1933.

This invention relates to eye glass shields, and more particularly to a shield which can be readily mounted on any conventional eye glass frame.

An object of this invention is to provide a shield of this kind which can be used with any conventional eye glass frame and which is so constructed that it can be adjusted to any desired position within the frame, so that the glare can be diffused, thereby permitting safe night driving without inconvenience to the driver.

Another object of this invention is to provide a shield construction which is exceedingly simple so that it can be very cheaply manufactured and mounted on any desired eye glass frame.

The above and various other objects and advantages of this invention will in part be described in and in part be understood from the following detailed description of the present preferred embodiment, the same being illustrated in the accompanying drawing, wherein:—

Figure 1 is a detail rear elevation partly in section of an eye glass frame having a pair of shields constructed according to this invention mounted thereon.

Figure 2 is a fragmentary top plan view of the frame with the shields mounted thereon and positioned to deflect glare coming from the left side.

Figure 3 is a similar view but showing the shields mounted for deflection of glare coming from above.

Figure 4 is an enlarged fragmentary sectional view taken on the line 4—4 of Figure 3.

Referring to the drawing wherein like characters of reference designate corresponding parts throughout the several views, the letter F designates generally an eye glass frame which has mounted therein a pair of lenses 10. Interposed between the lens 10 and the frame F is a ring 11, which ring engages in a groove 13 provided in the frame F. The periphery of the ring 11 is provided with a curved portion to seat in the groove 13 so as to prevent the lens 10 from dropping out of the frame F.

The use of a lens 10 with the shield herein disclosed is optional inasmuch as if desired, the lens 10 may be omitted entirely and through the use of the ring 11, the shield 12 will be securely held in adjusted position within the frame F.

In order to provide means whereby the glaring light may be deflected, I have provided a pair of shields, generally designated as 12. These shields 12 are identical in construction and are made of transparent material such as celluloid or the like which has a degree of flexibility and are arcuate in cross section and in plan are formed as a parabola.

The inner end of the shield 12 is provided with a bead or curved portion 14, which curved portion 14 forms a base and is interposed between the ring 11 and the frame F. This bead or base 14 seats in the groove 13 of the frame F and preferably, the shield 12 is so mounted that the shield can be shifted to any desired position relative to the frame F, so that light rays coming from the front of the frame either from above or below or directly in front of the frame can be easily diffused.

As shown in Figures 1 and 2, the shields 12 are mounted so as to deflect light rays coming from in front of the wearer of the eye glass frame F, and are mounted so that a slight turning or shifting of the head to one side will carry the shields 12 to a position where they will diffuse the glaring light rays while, at the same time, permitting the wearer to see the side of the road on which he is driving.

It will, therefore, be noted from the foregoing that the shields herein disclosed will not in any way obstruct the view of the wearer but that a slight shifting either to one side or downwardly or upwardly will diffuse the glaring light rays while permitting free forward vision.

These shields can be mounted very quickly on any conventional eye glass frame and due to the thin construction of the shields when mounted within the frame will not unduly spread the rims of the frame. The shields 12 can be colored in any desired color such as green, amber or any other light diffusing color, and due to the fact that they are mounted directly in the frame of the glasses, the shields will not fall off as is the case where shields are removably positioned on the frames. Furthermore, due to the use of the bead 14, these shields 12 can be adjusted to any desired point within the circle of the frame.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An anti-glare means comprising in combination, a frame having grooved rim portions, a light diffusing member projecting forwardly of the frame, a bead constituting a base formed with the member and positioned within the grooved portion of the frame, and means engaging the bead for maintaining the base in adjusted position relative to the frame.

2. An anti-glare means comprising in combination, a frame having grooved rim portions, a light diffusing member, a transversely curved base formed with the member, said base seating in the groove of the frame, and a locking ring engaging the base to maintain the member in adjusted position relative to the frame.

In testimony whereof I hereunto affix my signature.

MARTIN K. KLEIN.